United States Patent
Tonge

(10) Patent No.: US 7,479,532 B2
(45) Date of Patent: *Jan. 20, 2009

(54) FLUOROCARBON ELASTOMER SILICONE VULCANIZATES

(75) Inventor: Lauren Tonge, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 198 days.

This patent is subject to a terminal disclaimer.

(21) Appl. No.: 10/581,474

(22) PCT Filed: Dec. 13, 2004

(86) PCT No.: PCT/US2004/041634

§ 371 (c)(1),
(2), (4) Date: Jun. 1, 2006

(87) PCT Pub. No.: WO2005/059028

PCT Pub. Date: Jun. 30, 2005

(65) Prior Publication Data

US 2007/0069187 A1    Mar. 29, 2007

Related U.S. Application Data

(60) Provisional application No. 60/529,711, filed on Dec. 15, 2003.

(51) Int. Cl.
C08G 77/06 (2006.01)
C08G 77/12 (2006.01)
C08G 77/20 (2006.01)
C08G 77/00 (2006.01)
C08F 8/00 (2006.01)
C08F 283/00 (2006.01)

(52) U.S. Cl. .............. 528/24; 528/31; 528/32; 525/104; 525/478; 525/479

(58) Field of Classification Search ......... 252/511; 528/24

See application file for complete search history.

(56) References Cited

U.S. PATENT DOCUMENTS

| | | | |
|---|---|---|---|
| 3,023,210 A | 2/1962 | Schutt | |
| 3,419,593 A | 12/1968 | Willing | |
| 3,536,680 A * | 10/1970 | Gerhard | 526/88 |
| 4,100,240 A * | 7/1978 | Bassani | 264/108 |
| 4,150,010 A * | 4/1979 | Itoh et al. | 524/506 |
| 4,263,414 A * | 4/1981 | West | 525/102 |
| 4,708,988 A * | 11/1987 | Tabb | 525/194 |
| 4,742,142 A | 5/1988 | Shimizu et al. | |
| 4,882,386 A * | 11/1989 | Stella | 525/133 |
| 4,904,726 A * | 2/1990 | Morgan et al. | 524/520 |
| 4,929,669 A * | 5/1990 | Jensen | 524/861 |
| 4,942,202 A | 7/1990 | Zama et al. | |
| 4,946,883 A * | 8/1990 | Kunimatsu et al. | 524/265 |
| 4,985,483 A | 1/1991 | Saito et al. | |
| 5,010,137 A | 4/1991 | Umeda et al. | |
| 5,171,787 A | 12/1992 | Zama et al. | |
| 5,175,325 A | 12/1992 | Brown et al. | |
| 5,209,872 A * | 5/1993 | Takahashi et al. | 252/511 |
| 5,227,111 A * | 7/1993 | Brangers et al. | 264/211.23 |
| 5,254,645 A * | 10/1993 | King et al. | 525/479 |
| 5,350,804 A | 9/1994 | Takita et al. | |
| 5,412,014 A * | 5/1995 | Romenesko | 524/416 |
| 5,424,374 A * | 6/1995 | Okami | 525/478 |
| 5,508,323 A * | 4/1996 | Romenesko et al. | 523/212 |
| 5,554,689 A | 9/1996 | Langstein et al. | |
| 5,589,119 A * | 12/1996 | Hetherington | 264/129 |
| 6,015,858 A | 1/2000 | Gornowicz | |
| 6,035,780 A | 3/2000 | Badesha et al. | |
| 6,114,445 A * | 9/2000 | Tzoganakis et al. | 525/102 |
| 6,433,049 B1 * | 8/2002 | Romenesko et al. | 524/261 |
| 6,479,580 B1 * | 11/2002 | Chorvath et al. | 524/588 |
| 6,544,710 B2 * | 4/2003 | Livengood et al. | 430/137.1 |
| 6,586,100 B1 * | 7/2003 | Pickering et al. | 428/421 |
| 6,613,846 B2 * | 9/2003 | Hintzer et al. | 525/326.2 |
| 7,173,092 B2 * | 2/2007 | Gornowicz et al. | 525/104 |
| 7,247,385 B1 * | 7/2007 | Tzoganakis et al. | 428/447 |
| 7,345,118 B2 * | 3/2008 | Chorvath et al. | 525/479 |
| 2003/0109623 A1 * | 6/2003 | Gornowicz et al. | 524/492 |
| 2007/0161749 A1 * | 7/2007 | Hartmann et al. | 525/192 |

FOREIGN PATENT DOCUMENTS

| | | | |
|---|---|---|---|
| EP | 28914 A1 * | 5/1981 | |
| EP | 636663 A2 * | 2/1995 | |
| EP | 671434 A1 * | 9/1995 | |

OTHER PUBLICATIONS

Tzoganakis, Reactive Extrusion of Polymers: A Review, Advances in Polymer Technology, 9, 321-330, 1989.*
Kirk-Othmer Encyclopedia of Chemical Technology, 4th Edition, vol. 8, pp. 990-1005, John Wiley & Sons, NY.

(Continued)

*Primary Examiner*—Randy Gulakowski
*Assistant Examiner*—Robert Loewe
(74) *Attorney, Agent, or Firm*—Alan Zombeck

(57) ABSTRACT

A method is disclosed for preparing an elastomeric base composition comprising: (I) mixing (A) a silicone base comprising a curable organopolysiloxane, (B) an optional crosslinking agent, (C) a cure agent in an amount sufficient to cure said organopolysiloxane; (II) mixing the product of step (I) with (D) a fluorocarbon elastomer, (E) an optional compatibilizer, (F) an optional catalyst, and (III) dynamically vulcanizing the organopolysiloxane, wherein the weight ratio of fluorocarbon elastomer (D) to silicone base (A) in the elastomeric base composition ranges from 95:5 to 30:70. The cured rubber compositions obtained from the elastomeric base compositions herein have good fuel resistance properties.

4 Claims, No Drawings

OTHER PUBLICATIONS

Polymeric Materials Encyclopedia, by J.C. Salamone, vol. 4, pp. 2495-2498, CRC Press, NY.

Encyclopedia of Polymer Science and Engineering, 2nd Edition, vol. 7, pp. 257-269.

"Fluoroelastomers," by K.L. Ring, A.Leder, and K.Sakota, Chemical Economics Handbook, SRI International 2000, Elastomers-Specialty 525.6000A.

* cited by examiner

FLUOROCARBON ELASTOMER SILICONE VULCANIZATES

CROSS REFERENCE TO RELATED APPLICATIONS

This application is a U.S. national stage filing under 35 U.S.C. §371 of PCT Application No. PCT/US2004/041634 filed on 13 Dec. 2004, currently pending, which claims the benefit of U.S. Provisional Patent Application No. 60/529,711 filed 15 Dec. 2003 under 35 U.S.C. §119 (e). PCT Application No. PCT/US2004/041634 and U.S. Provisional Patent Application No. 60/529,711 are hereby incorporated by reference.

The present invention relates to a method of making a fluorocarbon elastomeric base composition comprising a fluorocarbon and silicone, the product prepared by the method, and the cured fluorocarbon rubber obtained therefrom. The cured fluorocarbon rubber compositions have good fuel resistance properties despite the incorporation of silicone into the compositions.

Fluorocarbon elastomers (classified as FKM, FEP, and FFKM elastomers by the American Society of Test Methods (ASTM)) are an important class of industrial polymers due to their unique inherent properties. They are especially known to retain their elongation and tensile strength properties under extremely harsh chemical and thermal conditions. Fluorocarbon elastomers find use as sealing O-rings, molded goods, and extruded articles where the resulting fluorocarbon elastomer based articles are used in high temperature applications, and/or in applications where the article is exposed to harsh chemical environments. In particular, fluorocarbon elastomers are commonly used to make automotive components such as engine oil seals, fuel hoses, various O-rings, drive train seals, and other components that must maintain their properties while in contact with the operating conditions of combustion engines. However, the expense of fluorocarbon elastomers limits their use in many applications, while in other instances, current fluorocarbon elastomers lack certain physical property attributes, such as low temperature flex or modulus, and low durometer.

There have been relatively few successful attempts to provide modified fluorocarbon elastomers by the addition of, or combination with, hydrocarbon or siloxane based polymers. Stable uniform mixtures are difficult to obtain due to the incompatibility of fluorocarbons with these polymers. Moreover, blends must be co-crosslinkable. Some representative examples to provide fluorocarbon and silicone elastomer compositions include U.S. Pat. Nos. 4,942,202, 4,985,483, 5,010,137, 5,171,787 and 5,350,804.

U.S. Pat. No. 4,942,202 teaches a rubber composition and vulcanized rubber products, which included fluorocarbons. The '202 compositions are prepared by reacting an organic peroxide, under shear deformation, with (I) a silicone rubber, (II) a saturated elastomer that fails to react with an organic peroxide when it is used alone, and (III) another elastomer that is co-crosslinkable with the silicone rubber in the presence of an organic peroxide. The other elastomer (III) is also co-crosslinkable or highly miscible with component (II).

U.S. Pat. No. 4,985,483 discloses fluororubber compositions containing dispersed particles of cured silicone material. The '483 compositions contain from 0.1 to 30 weight parts per 100 weight parts of a fluorocarbon of a finely divided cured silicone material in the form of a rubber, gel, or resin. The silicone material is first cured before mixing with the fluorocarbon. Preferably the silicone material used in the '483 patent is prepared using aqueous dispersion techniques described in U.S. Pat. No. 4,742,142, which provides silicone rubber particles having a size of less than 100 micrometers.

U.S. Pat. No. 5,010,137 teaches rubber compositions, which include fluorocarbons, and oil seals and rubber hoses obtained therefrom. The '137 compositions are obtained by compounding a polyorganohydrogensiloxane and a group VIII transition metal compound with a rubber-forming polymer comprising (I) a vinyl containing polyorganosiloxane and (II) an organic rubber, and subjecting the resulting compound to hydrosilylation while effecting shear deformation.

U.S. Pat. No. 5,171,787 teaches silicone-based composite rubber compositions, including fluorocarbons, and uses thereof. The '787 compositions are prepared by compounding a (A) rubber forming polymer comprising a polyorganosiloxane and an organic rubber, (B) a silicon compound having at least two hydrolyzable groups per molecule, and (C) a heavy metal compound, amine, or quaternary ammonium salt which catalyzes the hydrolysis and condensation reaction; and allowing the resulting formulation to undergo hydrolysis and condensation reactions while the formulation is kept from being deformed by shearing; and a crosslinking agent subsequently added followed by crosslinking of said organic rubber.

U.S. Pat. No. 5,350,804 teaches a composite rubber composition which comprises (a) an organic rubbery elastomer composition have a Mooney viscosity of at least 70 at 100° C. forming the matrix phase of the composite rubber composition; and (b) cured silicone rubber as a dispersed phase in the matrix phase.

While these patents provide advances in the field, a need still exists to specifically modify fluorocarbon elastomers in an efficient manner to provide high performance elastomeric systems, while maintaining the inherent physical properties of fluorocarbons. In particular, there is a need to provide fluorocarbon elastomer compositions for use in various applications where high and or low temperature properties are required as well as resistance to fuels, oils, exhaust gases, or chemicals.

The present invention provides fluorocarbon elastomer compositions based on the incorporation of silicones with fluorocarbons using a dynamic vulcanization process. These fluorocarbon base elastomeric compositions result from the new mixing processes of the present invention. These new mixing processes provide compositions having significant quantities of a silicone rubber based composition incorporated into a fluorocarbon elastomer. However, the resulting cured fluorocarbon rubber composition prepared from the elastomeric base compositions of the present invention, maintain many of the desirable fluorocarbon physical property attributes, such as fuel impermeability.

Dynamic vulcanization techniques have been used to prepare thermoplastic elastomer compositions based on fluorocarbon resins, such as taught in U.S. Pat. No. 6,015,858. However, the '858 patent compositions are based on the use of a fluorocarbon resin having a glass transition temperature at room temperature or greater, and does not teach how to prepare fluorocarbon/silicone elastomer compositions that provide cured compositions having fuel permeability properties similar to the fluorocarbon based compositions alone.

This invention provides a method for preparing a fluorocarbon elastomeric base composition containing both a fluorocarbon and a silicone wherein a silicone base comprising a curable organopolysiloxane is first mixed with a cure agent to form a silicone compound, then mixed with a fluorocarbon elastomer, and the silicone compound is subsequently dynamically vulcanized within the modified fluorocarbon.

Thus, the present invention relates to a method for preparing a fluorocarbon elastomeric base composition comprising:

(I) mixing
(A) a silicone base comprising a curable organopolysiloxane,
(B) an optional crosslinking agent,
(C) a cure agent,
to form a silicone compound;
(II) mixing the silicone compound with
(D) a fluorocarbon elastomer,
(E) an optional compatibilizer,
(F) an optional catalyst; and
(III) dynamically vulcanizing the silicone compound, wherein the weight ratio of fluorocarbon elastomer (D) to silicone base (A) in the elastomeric base composition ranges from 95:5 to 30:70.

The invention further relates to the fluorocarbon elastomer base compositions obtained by the present method and cured fluorocarbon elastomeric compositions prepared therefrom.

The first step (I) of the method of the present invention is mixing;
(A) a silicone base comprising a curable organopolysiloxane,
(B) an optional crosslinking agent,
(C) a cure agent,
to form a silicone compound;

Component (A) is a silicone base comprising a curable organopolysiloxane (A') and optionally, a filler (A"). A curable organopolysiloxane is defined herein as any organopolysiloxane having at least two curable groups present in its molecule. Organopolysiloxanes are well known in the art and are often designated as comprising any number of M units ($R_3SiO_{0.5}$), D units ($R_2SiO$), T units ($RSiO_{1.5}$), or Q units ($SiO_2$) where R is independently any monovalent hydrocarbon group. Alternatively, organopolysiloxanes are often described as having the following general formula, $[R_mSi(O)_{4-m/2}]_n$, where R is independently any monovalent hydrocarbon group and m=1-3, and n is at least two.

The organopolysiloxane in the silicone base (A) must have at least two curable groups in its molecule. As used herein, a curable group is defined as any organic group that is capable of reacting with itself or another organic group, or alternatively with a crosslinker to crosslink the organopolysiloxane. This crosslinking results in a cured organopolysiloxane. Representative of the types of curable organopolysiloxanes that can be used in the silicone base are the organopolysiloxanes that are known in the art to produce silicone rubbers upon curing. Representative, non-limiting examples of such organopolysiloxanes are disclosed in "Encyclopedia of Chemical Technology", by Kirk-Othmer, 4$^{th}$ Edition, Vol. 22, pages 82-142, John Wiley & Sons, NY which is hereby incorporated by reference. Typically, organopolysiloxanes can be cured via a number of crosslinking mechanisms employing a variety of cure groups on the organopolysiloxane, cure agents, and optional crosslinking agents. While there are numerous crosslinking mechanisms, three of the more common crosslinking mechanisms used in the art to prepare silicone rubbers from curable organopolysiloxanes are free radical initiated crosslinking, hydrosilylation or addition cure, and condensation cure. Thus, the curable organopolysiloxane can be selected from, although not limited to, any organopolysiloxane capable of undergoing any one of these aforementioned crosslinking mechanisms. The selection of components (A), (B), and (C) are made consistent with the choice of cure or crosslinking mechanisms. For example if hydrosilylation or addition cure is selected, then a silicone base comprising an organopolysiloxane with at least two alkenyl groups (curable groups) would be used as component (A'), an organohydrido silicon compound would be used as component (B), and a platinum catalyst would be used as component (C). For condensation cure, a silicone base comprising an organopolysiloxane having at least 2 silicon bonded hydroxy groups or hydrolysable precursors of hydroxy groups (i.e. silanol or alkoxysilane, are considered as the curable groups) would be selected as component (A) and a condensation cure catalyst known in the art, such as a tin catalyst, would be selected as component (C). For free radical initiated crosslinking, any organopolysiloxane can be selected as component (A), and a free radical initiator would be selected as component (C) if the combination will cure within the time and temperature constraints of the dynamic vulcanization step (III). Depending on the selection of component (C) in such free radical initiated crosslinking, any alkyl group, such as methyl, can be considered as the curable groups, since they would crosslink under such free radical initiated conditions.

The quantity of the silicone compound, i.e. the mixture comprising components (A), (B) and (C), used can vary depending on the amount of FKM elastomer (D) used. It is convenient to report the weight ratio of fluorocarbon elastomer (D) to the silicone base (A) which typically ranges from 95:5 to 30:70, alternatively 90:10 to 40:60, alternatively 80:20 to 40:60.

Typically, the amount of component (C) used varies depending on the selection of the organopolysiloxane and cure system. However, an amount (C) sufficient to cure said organopolysiloxane should be used.

In the hydrosilation cure embodiment of the present invention, the selection of components (A), (B), and (C) can be made to produce a silicon rubber during the vulcanization process via hydrosilylation cure techniques. This embodiment is herein referred to as the hydrosilylation cure embodiment. Thus, in the hydrosilylation cure embodiment, (A') is selected from a diorganopolysiloxane containing at least 2 alkenyl groups having 2 to 20 carbon atoms and optionally (A"), a reinforcing filler. The alkenyl group is specifically exemplified by vinyl, allyl, butenyl, pentenyl, hexenyl and decenyl, preferably vinyl or hexenyl. The position of the alkenyl functionality is not critical and it may be bonded at the molecular chain terminals, in non-terminal positions on the molecular chain or at both positions. Typically, the alkenyl group is vinyl or hexenyl and that this group is present at a level of 0.0001 to 3 mole percent, alternatively 0.0005 to 1 mole percent, in the diorganopolysiloxane. The remaining (i.e., non-alkenyl) silicon-bonded organic groups of the diorganopolysiloxane are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. It will be understood, or course, that these groups are selected such that the diorganopolysiloxane has a glass temperature which is below room temperature and the cured polymer is therefore elastomeric. Typically, the non-alkenyl silicon-bonded organic groups in the diorganopolysiloxane makes up at least 85, or alternatively at least 90 mole percent, of the organic groups in the diorganopolysiloxanes. Thus, diorganopolysiloxane (A') can be a homopolymer, a copolymer or a terpolymer containing such organic groups. Examples include homopolymers comprising dimethylsiloxy units, homopolymers comprising 3,3,3-trifluoropropylmethylsiloxy units, copolymers comprising dimethylsiloxy units and phenylmethylsiloxy units, copolymers comprising dimethylsiloxy units and 3,3,3-trifluoropropylmethylsiloxy units, copolymers of dimethylsiloxy units and diphenylsiloxy units and interpolymers of dimethylsiloxy units, diphenylsiloxy units and phenylmethylsiloxy units, among others. The molecular structure is also not critical and is exemplified by straight-chain and partially branched straight-chain structures, the linear systems being the most typical.

Specific illustrations of diorganopolysiloxane (A') include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; trimethylsiloxy-endblocked 3,3,3-trifluoropropylmethyl siloxane copolymers; trimethylsiloxy-endblocked 3,3,3-trifluoropropylmethyl-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy.

The organopolysiloxane may also consist of combinations of two or more organopolysiloxanes. Alternatively, diorganopolysiloxane (A') is a linear polydimethylsiloxane homopolymer and is preferably terminated with a vinyl group at each end of its molecule or it is such a homopolymer which also contains at least one vinyl group along its main chain.

For the purposes of the present invention, the preferred diorganopolysiloxane is a diorganopolysiloxane gum with a molecular weight sufficient to impart a Williams plasticity number of at least about 30 as determined by the American Society for Testing and Materials (ASTM) test method 926. Although there is no absolute upper limit on the plasticity of component (A'), practical considerations of processability in conventional mixing equipment generally restrict this value. Typically, the plasticity number should be 40 to 200, or alternatively 50 to 150.

Methods for preparing high consistency unsaturated group-containing diorganopolysiloxanes are well known, and they do not require a detailed discussion in this specification.

Optional component (A") is any filler which is known to reinforce diorganopolysiloxane (A') and is preferably selected from finely divided, heat stable minerals such as fumed and precipitated forms of silica, silica aerogels and titanium dioxide having a specific surface area of at least about 50 m$^2$/gram. The fumed form of silica is a typical reinforcing filler based on its high surface area, which can be up to 450 m$^2$/gram. Alternatively, a fumed silica having a surface area of 50 to 400 m$^2$/g, or alternatively 90 to 380 m$^2$/g, can be used. The filler is added at a level of about 5 to about 150 parts by weight, alternatively 10 to 100 or alternatively 15 to 70 parts by weight, for each 100 parts by weight of diorganopolysiloxane (A').

The filler is typically treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes.

Component (A) may also contain other materials commonly used in silicone rubber formulations including, but not limited to, antioxidants, crosslinking auxiliaries, processing agents, pigments, and other additives known in the art which do not interfere with step (III) described infra.

In the hydrosilylation cure embodiment of the present invention, component (B) is added and is an organohydrido silicon compound (B'), that crosslinks with the diorganopolysiloxane (A'). The organohydrido silicon compound is an organopolysiloxane which contains at least 2 silicon-bonded hydrogen atoms in each molecule which are reacted with the alkenyl functionality of (A') during the dynamic vulcanization step (III) of the present method. A further (molecular weight) limitation is that Component (B') must have at least about 0.1 weigh percent hydrogen, alternatively 0.2 to 2 or alternatively 0.5 to 1.7, percent hydrogen bonded to silicon. Those skilled in the art will, of course, appreciate that either the diorganopolysiloxane (A') or component (B'), or both, must have a functionality greater than 2 to cure the diorganopolysiloxane (i.e., the sum of these functionalities must be greater than 4 on average). The position of the silicon-bonded hydrogen in component (B') is not critical, and it may be bonded at the molecular chain terminals, in non-terminal positions along the molecular chain or at both positions. The silicon-bonded organic groups of component (B') are independently selected from any of the saturated hydrocarbon or halogenated hydrocarbon groups described above in connection with diorganopolysiloxane (A'), including preferred embodiments thereof. The molecular structure of component (B') is also not critical and is exemplified by straight-chain, partially branched straight-chain, branched, cyclic and network structures, network structures, linear polymers or copolymers being typical. It will, of course, be recognized that this component must be compatible with A' (i.e., it is effective in curing the diorganopolysiloxane).

Component (B') is exemplified by the following: low molecular weight siloxanes such as $PhSi(OSiMe_2H)_3$; trimethylsiloxy-endblocked methylhydridopolysiloxanes; trimethylsiloxy-endblocked dimethylsiloxane-methylhydridosiloxane copolymers; dimethylhydridosiloxy-endblocked dimethylpolysiloxanes; dimethylhydrogensiloxy-endblocked methylhydrogenpolysiloxanes; dimethylhydridosiloxy-endblocked dimethylsiloxane-methylhydridosiloxane copolymers; cyclic methylhydrogenpolysiloxanes; cyclic dimethylsiloxane-methylhydridosiloxane copolymers; tetrakis(dimethylhydrogensiloxy)silane; trimethylsiloxy-endblocked methylhydridosiloxane polymers containing $SiO_{4/2}$ units; silicone resins composed of $(CH_3)_2HSiO_{1/2}$, and $SiO_{4/2}$ units; silicone resins composed of $(CH_3)_2HSiO_{1/2}$, $(CH_3)_3SiO_{1/2}$, and $SiO_{4/2}$ units; silicone resins composed of $(CH_3)_2HSiO_{1/2}$ and $CF_3CH_2CH_2SiO_{3/2}$; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Ph hereinafter denotes phenyl radical.

Typical organohydrido silicon compounds are polymers or copolymers comprising RHSiO units terminated with either $R_3SiO_{1/2}$ or $HR_2SiO_{1/2}$ units wherein R is independently selected from alkyl radicals having 1 to 20 carbon atoms, phenyl or trifluoropropyl, typically methyl. Also, typically the viscosity of component (B') is about 0.5 to 3,000 mPa·s at 25° C., alternatively 1 to 2000 mPa·s. Component (B') typically has 0.5 to 1.7 weight percent hydrogen bonded to silicon. Alternatively, component (B') is selected from a polymer consisting essentially of methylhydridosiloxane units or a copolymer consisting essentially of dimethylsiloxane units and methylhydridosiloxane units, having 0.5 to 1.7 weight percent hydrogen bonded to silicon and having a viscosity of 1 to 2000 mPa·s at 25° C. Such a typical system has terminal groups selected from trimethylsiloxy or dimethylhydridosiloxy groups. Alternatively, component (B') is selected from copolymer or network structures comprising resin units. The copolymer or network structures units comprise $RSiO_{3/2}$ units or $SiO_{4/2}$ units, and may also contain $R_3SiO_{1/2}$, $R_2SiO_{2/2}$, and or $RSiO_{3/2}$ units wherein R is independently selected from hydrogen or alkyl radicals having 1 to 20 carbon atoms, phenyl or trifluoropropyl, typically methyl. It is understood that sufficient R as hydrogen is selected such that component (B') typically has 0.5 to 1.7 weight percent hydrogen bonded to silicon. Also, typically the viscosity of component (B') is about 0.5 to 3,000 mPa·s at 25° C., alternatively 1 to 2000 mPa·s. Component (B') may also be a combination of two or more of the above described systems.

The organohydrido silicon compound (B') is used at a level sufficient to cure diorganopolysiloxane (A') in the presence of component (C), described infra. Typically, its content is adjusted such that the molar ratio of SiH therein to Si-alkenyl in (A') is greater than 1. Typically, this SiH/alkenyl ratio is below about 50, alternatively 1 to 20 or alternatively 1 to 12. These SiH-functional materials are well known in the art and many are commercially available.

In the hydrosilylation cure embodiment of the present invention, component (C) is a hydrosilation catalyst (C'), that accelerates the cure of the diorganopolysiloxane. It is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (C') is typically a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Alternatively, catalyst (C) is a neutralized complex of platinous chloride and divinyltetramethyldisiloxane.

Component (C') is added to the present composition in a catalytic quantity sufficient to promote the reaction between diorganopolysiloxane (A') and component (B') so as to cure the organopolysiloxane within the time and temperature limitations of the dynamic vulcanization step (III). Typically, the hydrosilylation catalyst is added so as to provide about 0.1 to 500 parts per million (ppm) of metal atoms based on the weight of the silicone base (A), alternatively 0.25 to 50 ppm.

In another embodiment, components (A), (B), and (C) are selected to provide a condensation cure of the organopolysiloxane. For condensation cure, an organopolysiloxane having at least 2 silicon bonded hydroxy groups or hydrolysable precursors of hydroxy groups (i.e. silanol or alkoxysilanes are considered as the curable groups) would be selected as component (A), and a condensation cure catalyst known in the art, such as a tin catalyst, would be selected as component (C). The organopolysiloxanes useful as condensation curable organopolysiloxanes are one or more organopolysiloxanes which contains at least 2 silicon bonded hydroxy groups or hydrolysable precursors of hydroxy groups (or silanol groups (SiOH)) in its molecule. Typically, any of the organopolysiloxanes described infra as component (A) in the addition cure embodiment, can be used as the organopolysiloxane in the condensation cure embodiment if at least two SiOH groups or SiOH precursor groups are additionally present, although the alkenyl group would not be necessary in the condensation cure embodiment. Optional component (B) can be selected from the organohydrido silicon compound as described infra for component (B). However, more typically, the crosslinker is selected from an alkoxy or acetoxy endblocked organopolysiloxanes, that are known in the art for effecting condensation cure of organopolysiloxanes. The condensation catalyst useful as the curing agent in this embodiment is any compound which will promote the condensation reaction between the SiOH groups of diorganopolysiloxane (A) and the reaction between the SiOH groups of diorganopolysiloxane (A) and the reactive groups on an optional crosslinking agent (B), when present, so as to cure the former by the formation of —Si—O—Si— bonds. Examples of suitable catalysts include metal carboxylates, such as dibutyltin diacetate, dibutyltin dilaurate, tin tripropyl acetate, stannous octoate, stannous oxalate, stannous naphthanate; amines, such as triethyl amine, ethylenetriamine; and quaternary ammonium compounds, such as benzyltrimethylammoniumhydroxide, beta-hydroxyethylltrimethylammonium-2-ethylhexoate and beta-hydroxyethylbenzyltrimethyldimethylammoniumbutoxide (see, e.g., U.S. Pat. No. 3,024,210).

In yet another embodiment, components (A), (B), and (C) can be selected to provide a free radical cure of the organopolysiloxane. In this embodiment, the organopolysiloxane can be any organopolysiloxane but typically, the organopolysiloxane has at least 2 alkenyl groups. Thus, any of the organopolysiloxane described supra as suitable choices for (A') in the addition cure embodiment can also be used in the free radical embodiment of the present invention. A crosslinking agent (B) is not required, but may aid in the free radical cure embodiment. The cure agent (C) can be selected from any of the free radical initiators described infra for the selection of component (F).

Step (I) of the method produces a mixture comprising components (A), optionally (B), and (C), herein referred to as "a silicone compound". Typically, but not required, the silicone compound can be considered as a silicone rubber premix because subsequent vulcanization of this mixture results in a cured silicone rubber. Thus, any mixing techniques, known for mixing such elastomeric materials, can be employed in the mixing step (I), including but not limited to mixers, kneaders or rolls and extrusion processes.

The silicone compound of step (I) can also be selected from any commercially available silicone compounds that can be considered as silicone rubber precursor compositions, providing the silicone compound comprises at least components (A) and (C) as described supra.

The silicone compound is then mixed with component (D), a fluorocarbon elastomer. Component (D) is any fluorocarbon elastomer having a glass transition temperature ($T_g$) below room temperature, alternatively below 23° C., alternatively below 15° C., alternatively below 0° C. "Glass transition temperature", means the temperature at which a polymer changes from a glassy vitreous state to a rubbery state. The glass transition temperature can be determined by conventional methods, such as dynamic mechanical analysis (DMA) and Differential Scanning Calorimetry (DSC). Fluorocarbon elastomers are well known in the art and many are commercially available. Fluorocarbon elastomers are denoted by ASTM as FKM, FEP, and FFKM and are abbreviated as herein as FKM. Representative, non-limiting examples of the FKM elastomers, useful as component (D) in the present invention can be found in summary articles of this class of materials such as in: "Encyclopedia of Chemical Technology", by Kirk-Othmer, 4$^{th}$ Edition, Vol. 8, pages 990-1005, John Wiley & Sons, NY; "Polymeric Materials Encyclopedia", by J. C. Salamone, Vol. 4, pages 2495-2498, CRC Press, NY; "Encyclopedia of Polymer Science and Engineering, 2$^{nd}$ Edition, Vol. 7, pages 257-269; and "Fluoroelastomers", by K.-L. Ring, A. Leder, and K Sakota, Chemical Economics Handbook-SRI International 2000, Elastomers-Specialty 525.6000A, all of which are hereby incorporated by reference.

Thus, the fluorocarbon elastomers maybe composed of combinations of the following fluorine-containing monomers: vinylidene fluoride, hexafluoropropene, pentafluoropropene, trifluoroethylene, trifluorochloroethylene, tetrafluoroethylene, vinyl fluoride, perfluoro(methylvinylether) and perfluoro(propylvinylidene). These monomers can also be copolymerized with copolymerizable monomers having cure sites, i.e. cure site monomers. These include, but not limited to; vinyl compounds such as acrylate esters, olefin compounds such as propylene, diene compounds, and monomers containing one or more of the following groups: carbon-bonded chlorine, carbon-bonded bromine or carbon-bonded iodine. Examples of the fluorine rubbers produced in this way include vinylidene fluoride-hexafluoropropylene copolymer, vinylidene fluoride-hexafluoropropyelene-tetrafluoroethylene terpolymer, tetrafluoroethylene-propylene co-polymer, and tetrafluoroethylene-vinylidene fluoride-propylene terpolymer.

Alternatively, the fluorocarbon elastomer comprises a copolymer of vinylidene fluoride and hexafluoropropene, a terpolymer of vinylidene fluoride, hexafluoropropene, and tetrafluoroethene, or a terpolymer of vinylidene fluoride, tetrafluoroethene, and perfluoromethylvinyl ether.

Representative, non-limiting, commercially available materials useful as component (D) include the fluorocarbon elastomers sold under the tradenames of: VITON® by Dupont-Dow Elastomers, (Wilmington, Del.); Dyneon™ by Dyneon LLC (Oakdale, Minn.); Tecnoflon® by Solvay Solexis, Inc. (Bollate, Italy); Aflas™ by Asahi Glass Co. Ltd. (Ichihara, Chiba Prefecture); and Dai-el™ by Daikin Industries Ltd. (Settsu, Osaka Prefecture).

The fluorocarbon elastomer or the silicone base can be modified by the addition of an optional compatibilizer, component (E), to produce a modified elastomer. The modified elastomer can be considered either as chemically modified or physically modified depending on the selection of components (D) or (C), (E), and (F), and accompanying conditions used in this mixing step that are further delineated infra. In the embodiment of the present invention that prepares a chemically modified fluorocarbon elastomer, components (D), (E), and optionally (F) are selected and mixed in such a manner to produce a reaction product of the fluorocarbon elastomer and the compatibilizer. In the embodiment of the present invention that prepares a physically modified fluorocarbon elastomer, components (D), (E), and optionally (F) are selected and mixed in such a manner to produce a physical mixture product of the fluorocarbon elastomer and the compatibilizer. In any case, the FKM, silicone base, for fluorocarbon/silicone mixture is modified in such a manner so as to produce a fluorocarbon/silicone mixture which has a continuous fluorocarbon phase and a discontinuous (i.e. internal) silicone phase.

In the chemically modified fluorocarbon embodiment, (D) is selected from a FKM comprising a fluorocarbon polymer that can react with the compatibilizer (E) to produce a modified fluorocarbon elastomer. Typically the fluorocarbon polymer useful in fluorocarbon elastomer component (D) of the chemical modified fluorocarbon embodiment is a polymer, copolymer, or terpolymer prepared from at least one monomer having an olefinic groups or a carbon-bonded reactive group selected from hydrogen, chlorine, bromine or iodine, and one monomer having a carbon-bonded fluorine. The carbon-bonded reactive group and carbon-bonded fluorine can be in the same or separate monomers. The fluorocarbon polymer can be the same or a mixture of various fluorocarbon polymers. Thus, it is contemplated that the fluorocarbon polymer may be a copolymer of vinylidene difluoride or vinyl fluoride with one or more fluoroolefins, such as tetrafluoroethylene (TFE), hexafluoropropene (HFP) or a perfluoroalkylvinylether, such as perfluoromethylvinyl ether. It can also be a copolymer of TFE with ethylene or a copolymer of hexafluoropropene with ethylene. However, the fluorocarbon polymer should react with the compatibilizer in the chemically modified fluorocarbon elastomer embodiment, as described infra. Although not wishing to be bound to any theory, the present inventors believe the presence olefinic groups or a carbon-bonded reactive group selected from hydrogen, chlorine, bromine or iodine in at least one of the monomers used to prepare the FKM polymer permits for the reaction of the fluorocarbon polymer with the compatibilizer, component (E) in the chemically modified fluorocarbon elastomer embodiment It is anticipated that the FKM elastomer, component (D), can be a mixture of fluorocarbon polymers. However in the chemically modified fluorocarbon embodiment, at least 2 wt. %, alternatively at least 5 wt. %, or alternatively at least 10% of the fluorocarbon elastomer composition should contain a fluorocarbon polymer prepared from at least one monomer containing olefinic groups or monomers containing one of the following groups: a carbon-bonded hydrogen or carbon-bonded chlorine or carbon-bonded bromine or carbon-bonded iodine.

The structure of the optional compatibilizer (E) is not critical. The function of the compatibilizer is to modify the FKM elastomer (D) or the silicone base (A) to produce a mixture having a continuous fluorocarbon phase and a discontinuous (i.e. internal) silicone phase. Thus, compatibilizer (E) can be selected from any hydrocarbon, organosiloxane, fluorocarbon, or combinations thereof that would be expected to modify the FKM elastomer in a manner to enhance the mixing of the silicone base (A) with the FKM elastomer (D) to produce a mixture having a continuous fluorocarbon phase and a discontinuous (i.e. internal phase) silicone phase. However, the compatibilizer, or the resulting modified FKM elastomer, must not prevent the dynamic cure of the organopolysiloxane component, described infra. Alternately, compatibilizer (E) can be selected from any hydrocarbon, organosiloxane, fluorocarbon, or combinations thereof that would be expected to modify the silicone base in a manner to enhance the mixing of the silicone base (A) with the FKM elastomer (D) to produce a mixture having a continuous fluorocarbon phase and a discontinuous (i.e. internal) silicone phase. However, the compatibilizer, or the resulting modified silicone, must not prevent the dynamic cure of the organopolysiloxane component, described infra.

In the physically modified embodiment, the compatibilizer (E) can be selected from any compatibilizer known in the art to enhance the mixing of a silicone base with a FKM elastomer. Typically, such compatibilizers are the reaction product of an organopolysiloxane and a fluorocarbon polymer. Representative non-limiting examples of such compatibilizers are described in U.S. Pat. Nos. 5,554,689 and 6,035,780, both of which are incorporated by reference herein.

In the chemically modified embodiment, typically the compatibilizer (E) can be selected from ($E^1$) organic (i.e., non-silicone) compounds which contain 2 or more olefin groups, ($E^2$) organopolysiloxanes containing at least 2 alkenyl groups, ($E^3$) olefin-functional silanes which also contain at least one hydrolyzable group or at least one hydroxyl group attached to a silicon atom thereof, ($E^4$) an organopolysiloxane having at least one organofunctional groups selected from amine, amide, isocyanurate, phenol, acrylate, epoxy, and thiol groups, ($E^5$) a dehydrofluorination agent, and any combinations of ($E^1$), ($E^2$), ($E^3$), ($E^4$) and ($E^5$).

Organic compatibilizer ($E^1$) can be illustrated by compounds such as diallyphthalate, triallyl isocyanurate, 2,4,6-triallyloxy-1,3,5-triazine, triallyl trimesate, low molecular weight polybutadienes, 1,5-hexadiene, 1,7-octadiene, 2,2'-diallylbisphenol A, N,N'-diallyl tartardiamide, diallylurea, diallyl succinate and divinyl sulfone, inter alia.

Compatibilizer ($E^2$) may be selected from linear, branched or cyclic organopolysiloxanes having at least 2 alkenyl groups in the molecule. Examples of such organopolysiloxanes include divinyltetramethyldisiloxane, cyclotrimethyltrivinyltrisiloxane, cyclo-tetramethyltetravinyltetrasiloxane, hydroxy end-blocked polymethylvinylsiloxane, hydroxy terminated polymethylvinylsiloxane-co-polydimethylsiloxane, dimethylvinylsiloxy terminated polydimethylsiloxane, tetrakis(dimethylvinylsiloxy)silane and tris(dimethylvinylsiloxy)phenylsilane. Alternatively, compatibilizer (B") is a hydroxy terminated polymethylvinylsiloxane [HO(MeViSiO)$_x$H] oligomer having a viscosity of about 25-100 m Pa-s, containing 20-35% vinyl groups and 2-4% silicon-bonded hydroxy groups.

Compatibilizer ($E^3$) is a silane which contains at least one alkylene group, typically comprising vinylic unsaturation, as well as at least one silicon-bonded moiety selected from hydrolyzable groups or a hydroxyl group. Suitable hydrolyzable groups include alkoxy, aryloxy, acyloxy or amido groups. Examples of such silanes are vinyltriethoxysilane, vinyltrimethoxysilane, hexenyltriethoxysilane, hexenyltrimethoxy, methylvinyldisilanol, octenyltriethoxysilane, vinyltriacetoxysilane, vinyltris(2-ethoxyethoxy)silane, methylvinylbis(N-methylacetamido)silane, methylvinyldisilanol.

Compatibilizer ($E^4$) is an organopolysiloxane having at least one organofunctional groups selected from amine, amide, isocyanurate, phenol, acrylate, epoxy, and thiol groups.

Compatibilizer ($E^5$) is a dehydrofluorination agent selected from alkaline metal oxides or hydroxides. The dehydrofluorination agent modifies the FKM elastomer via a dehydrofluorination reaction to form additional double bonds on the FKM elastomer. The resulting double bonds provide reactive sites for further reaction of the FKM elastomer with other compatibilizers and/or silicone base (D). Typically the dehydrofluorination agent is an alkaline oxide or hydroxide selected from calcium hydroxide, magnesium hydroxide, calcium oxide, calcium hydroxide. When a dehydrofluorination agent is used, some of the FKM cure agents, described infra, are preferably added.

It is possible that a portion of the curable organopolysiloxane of the silicone base component (A) described supra, can also function as a compatibilizer. For example, a cure agent (C) or catalyst (F) can be used to react a portion of the curable organopolysiloxane of silicone base (A) with the FKM elastomer to produce a modified FKM elastomer. In another chemical modification embodiment any FKM elastomer can be selected as component (D) providing that the FKM elastomer contains at least one group capable of reacting with at least a portion of the silicone compound. In other words, the FKM elastomer should be capable of reacting with the silicone base via the operative cure mechanism selected for the organopolysiloxane. A cure agent (C) is added to the organopolysiloxane, component (A), and optionally crosslinker component (B), to cure the organopolysiloxane via a dynamic vulcanization process. Typically during the dynamic vulcanization process, i.e. step (III), the cure chemistry occurring at the surface of the silicone compound can also react with the FKM elastomer, which furthers the dispersion of the silicone within the FKM elastomer. Representative non-limiting examples of the reactive groups on the FKM elastomer include methyl, methylene, vinyl, and halogens. For example, a hydrogen on the FKM elastomer could react with a peroxide, selected as the cure agent for the silicone compound, thus forming a bond between the organopolysiloxane and the FKM elastomer. As another example, a vinyl group on the vinyl elastomer could react via the addition cure mechanism or radical cure mechanism.

The amount of compatibilizer (E) used per 100 parts of FKM elastomer (D) can be determined by routine experimentation. Typically, 0.05 to 15 parts by weight, alternatively 0.05 to 10 parts by weight, or alternatively 0.1 to 5 parts of the compatibilizer is used for each 100 parts of FKM elastomer.

Depending on the type of modification, typically, the compatibilizer can be added either to the silicone compound in step (I) or to the FKM elastomer prior to step (II) or to the FKM/silicone mixture during step (II).

Optional component (F) is a catalyst. Typically, the catalyst is used in the chemically modified embodiments. As such, it is typically a radical initiator selected from any organic compound which is known in the art to generate free radicals at elevated temperatures. The initiator is not specifically limited and may be any of the known azo or diazo compounds, such as 2,2'-azobisisobutyronitrile, but it is preferably selected from organic peroxides such as hydroperoxides, diacyl peroxides, ketone peroxides, peroxyesters, dialkyl peroxides, peroxydicarbonates, peroxyketals, peroxy acids, acyl alkylsulfonyl peroxides and alkyl monoperoxydicarbonates. A key requirement, however, is that the half life of the initiator be short enough so as to promote reaction of compatibilizer (E) with the FKM elastomer (D) or the silicone base (A) within the time and temperature constraints of step (II) or step (III). The modification temperature, in turn, depends upon the type of elastomer and compatibilizer chosen and is typically as low as practical consistent with uniform mixing of the components. Specific examples of suitable peroxides which may be used according to the method of the present invention include: 2,5-dimethyl-2,5-di(tert-butylperoxy)hexane; benzoyl peroxide; dicumyl peroxide; t-butyl peroxy O-toluate; cyclic peroxyketal; t-butyl hydroperoxide; t-butyl peroxypivalate; lauroyl peroxide; t-amyl peroxy 2-ethylhexanoate; vinyltris(t-butyl peroxy)silane;

di-t-butyl peroxide, 1,3-bis(t-butylperoxyisopropyl)benzene; 2,2,4-trimethylpentyl-2-hydroperoxide; 2,5-bis(t-butylperoxy)-2,5-dimethylhexyne-3, t-butyl-peroxy-3,5,5-trimethylhexanoate;

cumene hydroperoxide; t-butyl peroxybenzoate; and diisopropylbenzene mono hydroperoxide, inter alia. Less than 10 part by weight of peroxide per 100 parts of silicone base is typically used. Alternatively, 0.05 to 3 parts, and 0.1 to 1 parts, can also be employed.

Other than the specific limitations and process conditions associated with the selection of the catalyst as described above, step (II) can occur at a variety of conditions known in the art for effecting such mixing. Mixing can occur with any techniques or processes known in the art for mixing such elastomeric materials. Thus, any mixing techniques, known for mixing such elastomeric materials, can be employed in the mixing step (II), including but not limited to mixers, Banbury mixers, kneaders or rolls and extrusion processes.

In addition to the above-mentioned major components (A) through (F), a minor amount (i.e., less than 50 weight percent of the total composition) of one or more optional additive (G) can be incorporated in the fluorocarbon base elastomeric compositions of the present invention. These optional additives can be illustrated by the following non-limiting examples: extending fillers such as quartz, calcium carbonate, and diatomaceous earth; pigments such as iron oxide and titanium oxide; fillers such as carbon black and finely divided metals; heat stabilizers such as hydrated cerric oxide, calcium hydroxide, magnesium oxide; and flame retardants such as halogenated hydrocarbons, alumina trihydrate, magnesium hydroxide, wollastonite, organophosphorous compounds and other fire retardant (FR) materials, and other additives commonly used in the rubber art. These additives are typically added to the final composition after dynamic cure, but they may also be added at any point in the preparation provided they do not interfere with the dynamic vulcanization mechanism. These additives can be the same, or different, as the additional components added to prepare the cured elastomeric compositions, described infra.

The third step (III) of the method of the present invention is dynamically vulcanizing the organopolysiloxane. The dynamic vulcanizing step cures the organopolysiloxane. Step (III) can occur simultaneous with step (II), or alternatively following step (II). Step (III) is effected by the same mixing procedures described for step (II).

The method of the present invention is characterized by first mixing the cure agent (C) with the silicone base (A) to form a silicone compound, prior to mixing with the fluorocarbon elastomer (D). Accordingly, the fluorocarbon elastomeric base composition is typically prepared by mixing the silicone compound with a fluorocarbon elastomer (D), and optionally components (E) and (F) and then dynamically vulcanizing the organopolysiloxane of the silicone compound. Typically (G) would be added after step (III), but can be added anytime during the processing providing (G) does not interfere with cure of the silicone compound phase (e.g., (G) can be premixed with the FKM elastomer or with the silicone compound).

Mixing for all steps of the present method can be carried out in any device that is capable of uniformly dispersing the components, such as an internal mixer or a twin-screw extruder, the latter being preferred for commercial preparations. Any mixing techniques, known for mixing such elastomeric materials, can be employed in the method of the present invention, including but not limited to mixers, Banbury mixers, kneaders or rolls. Alternatively, extrusion processes can be employed. Alternatively, mixing step (II), as well as the dynamic vulcanization step (III) of the present method can be accomplished by using a twin-screw extruder. In one embodiment of the present inventive method, steps (II)-(III) are conducted on a twin-screw extruder in a time period of less than 2 minutes.

The present invention also relates to the fluorocarbon elastomeric compositions prepared according to the methods taught herein, and further to the cured elastomeric compositions prepared therefrom. The inventors believe the techniques of the present invention provide unique and useful fluorocarbon elastomeric compositions, as demonstrated by the inherent physical properties of the fluorocarbon base elastomeric compositions, vs compositions of similar combinations of fluorocarbon elastomers and silicone bases prepared by other methods or techniques. Furthermore, the cured fluorocarbon elastomer compositions, as described infra, prepared from the fluorocarbon base elastomeric compositions of the present invention also possess unique and useful properties. For example, cured fluorocarbon elastomers prepared from the fluorocarbon base elastomeric compositions of the present invention have surprisingly good hydrocarbon fuel swell properties and low permeation. Many silicones, especially dimethylpolysiloxane-based rubbers, are known to swell in volume when contacted with hydrocarbon fuels. Thus, when silicones are combined with fluorocarbons, the resulting cured elastomeric compositions often have worse fuel swell or permeability properties when compared to the fluorocarbon alone. Although not wishing to be bound be any theory, the inventors believe the methods of this invention provide compositions wherein the vulcanized silicone phase (prepared from the in-situ dynamic vulcanization) is thoroughly dispersed within the fluorocarbon. In other words, the fluorocarbon can be considered the continuous phase of the mixture and the silicone as the internal phase. As a result, when the cured compositions are contacted with a hydrocarbon fuel, the continuous fluorocarbon phase minimizes direct contact of the hydrocarbon fuel with the silicone phase. Subsequently, fuel swell properties, or fuel permeabilities are not substantially reduced for the cured FKM elastomeric compositions prepared according to the techniques of this invention, as compared to the fuel swell properties of cured fluorocarbon elastomeric compositions containing comparable levels of silicones (especially silicone rubber), but prepared by other techniques such as simple mixing of a silicone rubber with a fluorocarbon elastomer. Furthermore, additional physical property benefits are expected in other uses and applications of the present compositions where it would be advantageous to prevent contact of the silicone phase in the fluorocarbon mixture with an external medium that would otherwise adversely affect the silicone phase.

The cured FKM elastomeric compositions of the present invention can be prepared by curing the FKM elastomer component of the fluorocarbon base elastomeric composition of the present invention via known curing techniques. Curing of FKM elastomers, and additional components added prior to curing, are well known in the art. Any of these known techniques, and additives, can be used to cure the fluorocarbon base elastomeric compositions of the present invention and prepare cured fluorocarbon elastomers therefrom. Representative examples of such curing techniques, and typical additives are disclosed in "Encyclopedia of Chemical Technology", by Kirk-Othmer, 4$^{th}$ Edition, Vol. 8, pages 990-1005, John Wiley & Sons, NY, which is hereby incorporated by reference. Further, representative, non-limiting, examples of the cure techniques, and typical additives, that can be used are described in the technical information publications offered by major FKM elastomer suppliers, such as for example, *Fluoroelastomers; Compounding Fluoroelastomers*, and *Fluoroelastomers Curing Fluoroelastomers* by Dyneon, as shown at www.dyneon.com (May, 2002). Typically, FKM elastomers are cured by one of three crosslinking mechanisms utilizing cure agents selected from diamine compounds, bisphenolonium compounds, or peroxides. (Cure agents that are added for the purpose of curing the FKM elastomer, are referred herein as FKM cure agents, to distinguish these cure agents from the cure agents added to cure the silicone base component of the present invention.) The cure process of FKM elastomers also typically involves two steps. The first step often involves the application of heat and pressure in a mold to shape the article, followed optionally by a high temperature post cure step to produce the finished cured product.

Additional components can be added to the fluorocarbon base elastomeric compositions prior to curing the FKM elastomer component. These include blending other FKM elastomers or other fluorocarbon based elastomer compositions into the fluorocarbon base elastomeric compositions of the present invention. These additional components can also be any component or ingredient typically added to a FKM elastomer or FKM elastomer gum for the purpose of preparing a cured FKM elastomer composition. Typically, these components can be selected from acid acceptors, fillers, processing aids, and curatives. Many commercially available FKM elastomers can already comprise these additional components. FKM elastomers having these additional components can be used as component (D), described supra, providing they do not prevent the dynamic vulcanization of the silicone base in step (III) of the method of this invention. Alternatively, such additional components can be added to the fluorocarbon base elastomeric composition prior to the final curing of the FKM elastomer.

Non limiting examples of the acid acceptors useful to prepare cured FKM elastomers from the inventive fluorocarbon base elastomeric compositions include; calcium hydroxide, magnesium oxide, lead oxide (Litharge), $PbHPO_3$ (Dyphos), calcium oxide, and zinc oxide.

Curatives are any component added to the base FKM elastomer composition that enhances the cure of the FKM elastomer. Thus, curatives can comprise FKM curing agents cure-promoters, and acid acceptors (described supra). For example, the base FKM elastomer may be cross linked by incorporating FKM cure agents or combinations of FKM cure agents such as a bisphenol and a organic onium salt accelerator, for example bisphenol A or bisphenol AF with triphenylbenzylphosphonium chloride or diphenylbenzyl(diethylamine)phosphonium chloride; a polyfunctional organic amine or derivative of the amines such as a carbamate, for example hexamethylenediamine carbamate; and organic peroxides and cure promoters which act with the free radicals generated from decomposition of the peroxide to provide a more useful cure.

The cured FKM elastomer composition may also comprise a filler. Examples of fillers include carbon black; coal dust fines; silica; metal oxides, e.g., iron oxide and zinc oxide; zinc sulfide; calcium carbonate; wollastonite, calcium silicate, barium sulfate, and others known in the art.

The cured fluorocarbon elastomers described herein are expected to have similar fuel swell and/or chemical resistance properties as conventional FKM elastomers, but with improved low temperature performance and processing characteristics. The cured elastomers of the present invention can be used in a similar manner as conventional or known high performance elastomers, including FKM and silicone elastomers. They can be used to construct various articles of manufacture illustrated by but not limited to O-rings, gaskets, seals, liners, hoses, tubing, diaphragms, boots, valves, belts, blankets, coatings, rollers, molded goods, extruded sheet, caulks, and extruded articles, for use in applications areas which include but not are limited to transportation including automotive, watercraft, and aircraft; chemical and petroleum plants; electrical: wire and cable: food processing equipment; nuclear power plants; aerospace; medical applications; and the oil and gas drilling industry and other applications which typically use high performance elastomers such as ECO, FKM, HNBR, acrylic rubbers and silicone elastomers.

EXAMPLES

The following examples are presented to further illustrate the compositions and method of this invention. All parts and percentages in the examples are on a weight basis and all measurements were obtained at approximately 23° C., unless otherwise indicated.

Materials

GP-50 is a silicone rubber base marketed by Dow Corning Corporation as Silastic® GP-50 Silicone Rubber.

GP-70 is a silicone rubber base marketed by Dow Corning Corporation as Silastic® GP-70 Silicone Rubber.

GP-700 is a silicone rubber base marketed by Dow Corning Corporation as Silastic® New GP 700 Silicone Rubber.

LCS-755 is a silicone rubber base marketed by Dow Corning Corporation as Silastic®LCS-755 Silicone Rubber.

LS 4-9062 is a fluorosilicone rubber base marketed by Dow Coming Corporation as Silastic® LS 4-9062 Fluorosilicone Rubber.

LS5-2040 is a fluorosilicone rubber base marketed by Dow Coming Corporation as Silastic® LS5-2040 Fluorosilicone Rubber.

CATALYST 1 is a 1.5% platinum complex of 1,3-diethenyl-1,1,3,3-tetramethyldisiloxane; 6% tetramethyldivinyldisiloxane; 92% dimethylvinyl ended polydimethylsiloxane and 0.5% dimethylcyclopolysiloxanes having 6 or greater dimethylsiloxane units.

ETCH is 1-ethynyl-1-cyclohexanol 99% (CAS# 78-27-3) marketed by Aldrich Chemical Company, Inc.

TRIG 101 is 2,5-dimethyl-2,5-di(tert-butylperoxy)hexane (CAS# 78-63-7) marketed by Akzo Nobel Chemicals, Inc. as TRIGONOX® 101.

TRIG 145E is 2,5-dimethyl-2,5-di(tert-butylperoxy)hexyne (CAS# 78-63-7) marketed by Akzo Nobel Chemicals, Inc. as TRIGONOX® 145-E85

TRIG 145PD is 2,5-dimethyl-2,5-di(tert-butylperoxy)hexyne (CAS# 78-63-7) marketed by Akzo Nobel Chemicals, Inc. as TRIGONOX® 145B-45PD.

TRIG A-W70 is a solution of 70% tert-butyl hydroperoxide (CAS# 75-91-2) in 30% water marketed by Akzo Nobel Chemicals, Inc. as TRIGONOX® A-W70.

VAROX is 2,5-dimethyl-2,5-di(tert-butylperoxy)hexane on an inert filler marketed by R.T. Vanderbilt, Company, Inc. as VAROX® DBPH-50.

COMPATIBILIZER 1 is a hydroxy end-blocked methylvinylsiloxane oligomer having a viscosity of about 35 mPa-s and containing 30% —CH=$CH_2$ groups and 3% OH groups.

AN-3 is a masterbatch of magnesium oxide in a methyl vinyl silicone rubber carrier and is marketed by Dow Coming Corporation as Silastic® AN-3 Modifier.

SR633 is a zinc diacrylate (CAS# 14643-87-9) and is marketed by Sartomer Company, Inc. as Saret® Modified Metallic Diacrylate (Difunctional) Saret® SR633

HT-1 is a masterbatch of ceric hydroxide in a dimethyl silicone rubber carrier and is marketed by Dow Corning Corporation as Silastic® HT-1 Modifier TAIC is Triallyl-1,3,5-triazine-2,4,6-(1H,3H,5H)-trione (CAS# 1025-15-6), also known as triallyl isocyanurate, marketed by Aldrich Chemical Company, Inc.

ZnO is zinc oxide USP powder (CAS# 1314-13-2) marketed by Fisher Scientific.

VC-20 is a masterbatch made from 67% of a copolymer of vinylidene fluoride and hexafluoropropene (CAS# 9011-17-0) and 33% benzyltriphenylphosphonium chloride (CAS# 1100-88-5) and marketed by Dupont Dow Elastomers, LLC as Viton™ Curative No. 20.

VC-30 is a masterbatch made from a copolymer of vinylidene fluoride and hexafluoropropene (CAS# 9011-17-0), a terpolymer of vinylidene fluoride, hexafluoropropene, and tetrafluoroethene (CAS# 25190-89-0), Bisphenol AF (CAS# 1478-61-1), and 4,4'-dichlorodiphenyl sulfone (CAS# 80-07-9) and marketed by Dupont Dow Elastomers, LLC as Viton™ Curative No. 30.

P457 is a copolymer of vinylidene fluoride, tetrafluoroethylene, and hexafluoropropene, (CAS# 25190-89-0) and is marketed by Solvay Solexis, Inc. as Tecnoflon® P457.

G902 is 1-Propene, 1,1,2,3,3,3-hexafluoro-polymer with 1,1-difluoroethene and tetrafluoroethene Iodine modified fluoroelastomer (CAS# 25190-89-0) and is marketed by Daikin America, Inc. as DAI-EL™ Fluoroelastomer G-902.

B-200 is made from a terpolymer of vinylidene fluoride, hexafluoropropene, and tetrafluoroethene (CAS# 25190-89-0) and marketed by Dupont Dow Elastomers, LLC as Viton® B-200.

B-600 is made from a terpolymer of vinylidene fluoride, hexafluoropropene, and tetrafluoroethene (CAS# 25190-89-0) and marketed by Dupont Dow Elastomers, LLC as Viton® B-600.

GBL 200 is made from a terpolymer of vinylidene fluoride, hexafluoropropene, tetrafluoroethene and bromotetrafluorobetene (CAS# 74398-72-4) and marketed by Dupont Dow Elastomers, LLC as Viton® GBL 200.

N990 is carbon black marketed by Engineered Carbons, Inc. as MT Carbon Black N990.

CRI-ACT-45 is a 45% active dispersion of a 2/1 ration of Ca(OH)2 and Magnesium Oxide on fluoroelastomer supplied by Cri-Tech, a division of IMMIX Technologies, LLC.

X-LINKER 1 is an SiH-functional crosslinker consisting essentially of 65.6 % MeHSiO units, 32.3 % $Me_2SiO$ units and 1.8% $Me_3SiO_{1/2}$ units and has a viscosity of approximately 29 mPa·s.

Testing

The tensile, elongation, and 100% modulus properties of the cured elastomeric base compositions were measured by a procedure is based on ASTM D 412. Shore A Durometer was measured by a procedure is based on ASTM D 2240.

Permeation was evaluated using Payne cups by a modified ASTM E96 method. CE10 test fuel is 10 volume percent ethanol in Reference Fuel C. CE10 was placed in the permeation cup, a rubber diaphragm was the placed on top of the cup then secured with a sealing rig held down with setscrews. The cup was inverted for direct fuel contact on the diaphragm. The cup was placed in an oven at 60° C. Weight loss measurements were taken until the permeation rate was constant. Permeation rates were calculated per ASTM E96 using the surface area of the diaphragm and reported in mm·grams/$m^2$·day units.

Example 1

GP-70 (100 parts), AN-3 (1 part), TAIC (1 part) and Trig 145E (0.5 parts) were mixed on a 2-roll mill to form a silicone compound. B-600 (180 g) was added to a 310 ml Haake mixer equipped with rotor-rollers at 160° C. and 50 rpm (revolutions per minute). The silicone compound (121 g) was added when the internal temperature of the FKM was 160° C. After a torque increase, the material temperature was about 220° C. The fluorocarbon elastomeric base composition was removed at 20 minutes.

The resulting fluorocarbon base elastomeric composition (250 g) was compounded on a mill until uniform with VC-20 (5.04 g), VC-30 (6.38 g), and Cri-Act-45 (33.60 g). The samples were press cured for 10 minutes at 177° C., and then post-cured for 24 hours at 232° C. to give a Tensile Strength of 7.0 MPa, an Elongation of 286% and a Permeation of 2630 mm·gm/day·$m^2$.

Example 2

GP-70 (100 parts) and P457 (6.6 parts) were mixed in a mixer. To this blend AN-3 (0.73 part), TAIC (1.93 part) and Trig 145E (1.22 parts) were added on a 2-roll mill to form a silicone compound. B-600 (214 g) was added to a 310 ml Haake mixer equipped with rotor-rollers at 160° C. and 50 rpm (revolutions per minute). The silicone compound (110 g) was added when the internal temperature of the FKM was 160° C. After a torque increase, the material temperature was about 220° C. The fluorocarbon elastomeric base composition was removed at 16 minutes.

The resulting fluorocarbon base elastomeric composition (250 g) was compounded on a mill until uniform with VC-20 (5.79 g), VC-30 (7.34 g), and Cri-Act-45 (38.62 g). The samples were press cured for 10 minutes at 177° C., and then post-cured for 24 hours at 232° C. to give a Tensile Strength of 6.7 MPa, an Elongation of 184% and a Permeation of 1372 mm·gm/day·$m^2$.

Example 3

GP-700 (100 parts), TAIC (0.3 part), ZnO (1 part) and Trig 145PD (0.28 parts) were mixed on a 2-roll mill to form a silicone compound. P457 (180 g) was added to a 310 ml Haake mixer equipped with rotor-rollers at 160° C. The silicone compound (121 g) was added when the internal temperature of the FKM was 160° C. For Sample A the rpm (revolutions per minute) was 50, whereas for Sample B it was 100 rpm. After a torque increase, the fluorocarbon elastomeric base compositions were removed 5 minutes following the torque maximum.

The resulting fluorocarbon base elastomeric compositions were compounded on a mill until uniform with 3 parts each of ZnO, TAIC, and TRIG 101 per 100 parts of P457 present in the sample. The samples were press cured for 10 minutes at 177° C., and then post-cured for 24 hours at 232° C. to give a Shore A Durometer of 71, a Tensile Strength of 9.3 MPa, and an Elongation of 310 for Sample A, and a Shore A Durometer of 67, a Tensile Strength of 10.6 MPa, and an Elongation of 319 for Sample B.

Example 4

For Sample A, LS 4-9062 (100 parts), HT-1 (1 part), ZnO (5 part) and Trig 145PD (0.2 parts) were mixed on a 2-roll mill to form a silicone compound. Sample B is Sample A with SR633 (0.5 parts). G902 (270 g) was added to a 379 ml Haake mixer equipped with banbury-rollers at 150° C. The silicone compound (194 g) was added when the internal temperature of the FKM was 140° C. and mixed at 125 rpm (revolutions per minute). After a torque increase, the fluorocarbon elastomeric base compositions were removed 5 minutes following the torque maximum at 9 minutes. Sample C and Sample D are the same as Sample A and Sample B respectively except G902 was replaced with P457.

Sample A and Sample B were compounded until on a mill until uniform with ZnO (5 parts), TAIC (4 parts), and TRIG 101 (1.5 parts) per 100 parts of G902 present in the sample. The samples were press cured for 10 minutes at 160° C., and then post-cured for 4 hours at 200° C. Sample C and Sample D were compounded on a mill until uniform with ZnO (5 parts), TAIC (3 parts), and TRIG 101 (3 parts) per 100 parts of P457 present in the sample. The samples were press cured for 10 minutes at 177° C., and then post-cured for 4 hours at 200° C. The resulting properties are summarized in Table 1.

TABLE 1

|  | Example #4 | | | |
| --- | --- | --- | --- | --- |
|  | A | B | C | D |
| Permeation mm · gm/day · m² | 1322 | 769 | 1617 | 1733 |
| Tensile strength, MPa | 8.1 | 9.8 | 11.6 | 12.2 |
| Elongation, % | 309 | 346 | 335 | 353 |

Example 5

For Samples A-C, the silicone compounds listed below in Table 2 were mixed on a 2-roll mill to form the compound. Aflas150P (210 g) and the silicone compound were added to a 379 ml Haake mixer equipped with banbury-rollers at 150° C. and mixed at 125 rpm (revolutions per minute). After a torque increase, the fluorocarbon elastomeric base compositions were removed 5 minutes following the torque maximum at approximately 7-8 minutes. Sample D is a simple blend of Aflas150P (210 g), N990 (75 g) and GP-50 (90 g) under the same mix conditions for 14 minutes.

The samples were compounded until on a mill until uniform with TAIC (5 parts), and VAROX (2.4 parts) per 100 parts of fluorocarbon elastomeric composition or blend. The samples were press cured for 20 minutes at 170° C., and then post-cured for 4 hours at 175° C. The formulations and resulting properties are summarized in Table 2. Time to band was measured by placing 200 grams of the uncompounded rubber composition on 6-rolls (20 rpm front roll and 28 rpm back roll) at 50° C. with a gap of 1.75 mm and measuring the time for the compositions to be completely banded around the roll. Bleed was indicated by surface gloss after leaving the sheet to stand at room temperature for over 24 hours.

TABLE 2

|  | Example #5 | | | |
| --- | --- | --- | --- | --- |
|  | A | B | C | D |
| Silicone Compound, grams |  |  |  | Blend |
| GP-50 | 90 | 90 | 90 |  |
| Varox | 0.3 | 0.3 |  |  |
| Catalyst 1 |  | 0.15 | 0.15 |  |
| ETCH |  | 0.18 | 0.18 |  |
| X-linker 1 |  | 1.5 | 1.5 |  |
| N990 | 75 | 75 | 75 |  |

TABLE 2-continued

|  | Example #5 | | | |
| --- | --- | --- | --- | --- |
|  | A | B | C | D |
| Properties |  |  |  |  |
| Mooney (1 + 10)@121° C. | 54 | 122 | 127 | 137 |
| Time to Banding, sec | 55 | 15 | 180 | * |
| Bleed | Yes | No | No | Yes |
| Tensile strength, MPa | 8.6 | 9.0 | 8.9 | 8.5 |
| Elongation, % | 161 | 165 | 176 | 171 |

* Did not band at 1.75 mm. It banded at 1.5 mm.

Example 6

A fluorocarbon base elastomeric compositions was prepared using a 25 mm Werner and Pfleiderer twin-screw extruder with the processing section heated to 150° C. and a screw speed of 300 rpm at an output rate of 15 kg/hr. The process began with the addition of a fluorocarbon elastomer (B-202) to the extruder at a feed rate of 173.7 grams/minute, followed by a silicone compound consisting of GP-700 (100 parts), AN-3 (0.6 part), TAIC (1 part) and Trig 145PD (3.33 parts) at a feed rate of 76.3 grams/minute. The resulting fluorocarbon base elastomeric composition obtained from the extruder was compounded on a mill until uniform with 3 parts of VC-20, 3.8 parts of VC-30, and 20 parts of Cri-Act-45 to give 6 parts of calcium hydroxide and 3 parts of magnesium oxide per 100 parts of FKM. The sample was press cured for 10 minutes at 177° C., and then post-cured for 24 hours at 232° C. to give a Shore A Durometer of 62, a Tensile Strength of 7.2 MPa, an Elongation of 245% and a Permeation of 2079 mm·gm/day·m².

Example 7

A fluorocarbon base elastomeric compositions was prepared using a 25 mm Werner and Pfleiderer twin-screw extruder with the processing section heated to 150° C. and a screw speed of 600 rpm at an output rate of 15 kg/hr. The process began with the addition of a fluorocarbon elastomer (B-600) to the extruder at a feed rate of 165 grams/minute, followed by a silicone compound consisting of GP-70 (100 parts), P457 (11.1 parts), AN-3 (0.6 part), TAIC (2 part) and Trig 145E (1.5 parts) at a feed rate of 85 grams/minute. The resulting fluorocarbon base elastomeric composition obtained from the extruder was compounded on a mill until uniform with 3 parts of VC-20, 3.8 parts of VC-30, and 20 parts of Cri-Act-45 to give 6 parts of calcium hydroxide and 3 parts of magnesium oxide per 100 parts of FKM. The sample was press cured for 10 minutes at 177° C., and then post-cured for 24 hours at 232° C. to give a Tensile Strength of 7.3 MPa, an Elongation of 203% and a Permeation of 1500 mm·gm/day·m².

Example 8

Two fluorocarbon base elastomeric compositions were prepared using a 25 mm Werner and Pfleiderer twin-screw extruder with the processing section heated to 150° C. and a screw speed of 600 rpm at an output rate of 21 kg/hr. For Sample A, the process began with the addition of a fluorocarbon elastomer (P457) to the extruder at a feed rate of 216 grams/minute, followed by a silicone compound consisting of GP-700 (100 parts), ZnO (0.75 parts), TAIC (0.33 part) and Trig 145PD (0.3 parts) at a feed rate of 133 grams/minute. Sample B had the same feeds except that the rates were 176 grams/minute for the FKM and 173 grams/minute for the silicone compound. The resulting fluorocarbon base elastomeric compositions obtained from the extruder were compounded on a mill until uniform with 3 parts of ZnO, 3 parts of TAIC, and 3 parts Trig 101 per 100 parts of FKM. The samples were press cured for 10 minutes at 177° C., and then post-cured for 24 hours at 232° C. Sample A had a Tensile Strength of 9.6 MPa, an Elongation of 288% and a TR-10 value measured by ASTM D 1329-88(98) of –30° C. Sample B had a Tensile Strength of 9.6 MPa, an Elongation of 274% and a TR-10 value of –36° C. For comparison a sample of P457 compound the same way as Samples A and B had a TR-10 value of –21° C.

Example 9

Fluorocarbon base elastomeric composition A was prepared using a 25 mm Werner and Pfleiderer twin-screw extruder with the processing sections heated at 150° C. and 180° C. and a screw speed of 500 rpm at an output rate of 20 kg/hr. The process began with the addition of a fluorocarbon elastomer (G902) to the extruder at a feed rate of 242 grams/minute, followed by a silicone compound consisting of LCS-755 (100 parts), ZnO (5 part) and Varox (0.5 parts) at a feed rate of 92 grams/minute. Fluorocarbon base elastomeric composition B was prepared using a 40 mm twin-screw extruder with the processing sections heated at 150° C. and 200° C. and a screw speed of 300 rpm at an output rate of 80 kg/hr. The process began with the addition of the same silicone compound followed by the same fluorocarbon elastomer to the extruder at a feed rate of 289 grams/minute 945 grams/minute respectively. The resulting fluorocarbon base elastomeric compositions obtained from the extruder were compounded on a mill until uniform with 5 parts of ZnO, 4 parts of TAIC, and 1.5 parts Trig 101 per 100 parts of FKM. The samples were press cured for 10 minutes at 160° C., and then post-cured for 4 hours at 200° C. Sample A had a Tensile Strength of 11.5 MPa, an Elongation of 353% and a Permeation of 2320 mm·gm/day·m². Sample B had a Tensile Strength of 10.2 MPa, an Elongation of 319% and a Permeation of 2170 mm·gm/day·m². Sample B has a TR-10 value of –18° C. as compared to –7° C. for the original fluorocarbon elastomer.

Example 10

A fluorocarbon base elastomeric compositions was prepared using a 25 mm Werner and Pfleiderer twin-screw extruder with the processing section heated to 180° C. an and a screw speed of 300 rpm at an output rate of 20 kg/hr. The process began with the addition of a fluorocarbon elastomer (P457) to the extruder at a feed rate of 237 grams/minute, followed by a silicone compound consisting of GP-700 (100 parts), ZnO (0.75 parts), TAIC (0.5 part) and Trig 145PD (0.455 parts) at a feed rate of 97 grams/minute. The resulting fluorocarbon base elastomeric composition obtained from the extruder was compounded on a mill until uniform with 3 parts of ZnO, 3 parts of TAIC, and 3 parts Trig 101 per 100 parts of FKM. The sample was press cured for 10 minutes at 177° C., and then post-cured for 24 hours at 232° C. to give a Tensile Strength of 14.0 Mpa and an Elongation of 385%.

Example 11

Two fluorocarbon base elastomeric compositions were prepared using a 25 mm Werner and Pfleiderer twin-screw extruder with the processing sections heated at 120° C. and 150° C. and a screw speed of 300 rpm at an output rate of 20 kg/hr. For both samples, the extruder feed rate was 200 grams/minute fluorocarbon elastomer (P457) and 134 grams/minute for a silicone compound consisting of GP-700 (100 parts), ZnO (5 parts), and Trig 145PD (0.2 parts). For Sample A, the FKM was added to the extruder followed by the silicone compound. For Sample B, the silicone compound was added to the extruder followed by the FKM. The resulting fluorocarbon base elastomeric compositions obtained from the extruder were compounded on a mill until uniform with 5 parts of ZnO, 3 parts of TAIC, and 3 parts Trig 101 per 100 parts of FKM. The samples were press cured for 10 minutes at 177° C., and then post-cured for 4 hours at 200° C. Sample A had a Shore A Durometer of 66, a Tensile Strength of 14.4 Mpa and an Elongation of 330%. Sample B had a Shore A Durometer of 64, Tensile Strength of 12.9 MPa, and an Elongation of 320%.

Example 12

The following fluorocarbon base elastomeric compositions were prepared using a 25 mm Werner and Pfleiderer twin-screw extruder with the processing sections heated at 200° C. and a screw speed of 500 rpm at an output rate of 20 kg/hr. Fluorocarbon elastomeric compositions were made with GBL 200 with silicone compounds A, B, and C. Compound A contained LCS-755 (100 parts), ZnO (5 parts), and VAROX (0.4 parts). Compound B contained LS 5-2040 (100 parts), HT-1 (1 part) and VAROX (0.5 parts). Compound C contained GP 700 (100 parts), ZnO (5 parts) and VAROX (0.2 parts). Compositions at several weight ratios were made. The resulting fluorocarbon base elastomeric compositions obtained from the extruder were compounded with 5 parts of ZnO, 3 parts of TAIC, and 6 parts VAROX per 100 parts of FKM. The samples were press cured for 10 minutes at 160° C., and then post-cured for 4 hours at 200° C. The weight percentage FKM and the results are listed in Table 3.

TABLE 3

|  | Example #12 | | | | | | |
| --- | --- | --- | --- | --- | --- | --- | --- |
|  | A1 | B1 | B2 | B3 | C1 | C2 | C3 |
| Silicone Compound | A | B | B | B | C | C | C |
| Weight Percent FKM | 57 | 78 | 68 | 59 | 79 | 71 | 61 |
| Properties |  |  |  |  |  |  |  |
| Mooney (1 + 10)@121° C. | 38 | 25 | 29 | 38 | 34 | 39 | 46 |
| Durometer, Shore A | 60 | 59 | 60 | 60 | 70 | 71 | 71 |
| Tensile strength, MPa | 8.7 | 15.7 | 11.7 | 11.2 | 14.6 | 13.9 | 13.3 |
| Elongation, % | 217 | 368 | 352 | 312 | 319 | 305 | 303 |
| Permeation mm · gm/day · m² | 4000 | 420 | 650 | 860 | 1370 | 3680 | 8020 |

Example 13

For Sample A, LCS-755 (100 parts) and G902 (5 parts) were combined in a mixer. To this blend ZnO (5 parts) and VAROX (0.4 parts) were added on a 2-roll mill to form a silicone compound. Sample B is the same as Sample A except the G902 was not added. P457 (329 g) and the respective silicone compounds (142 g) were added to a 310 ml Haake mixer equipped with banbury blades at 150° C. and 125 rpm (revolutions per minute). The fluorocarbon elastomeric base composition was removed 5 minutes after a torque increase.

The resulting fluorocarbon base elastomeric compositions obtained from the extruder were compounded with 5 parts of ZnO, 3 parts of TAIC, and 6 parts VAROX per 100 parts of FKM. The samples were press cured for 10 minutes at 160° C. (designated A/M), and then post-cured for 4 hours at 200° C. (designated PC). The results are shown in Table 4.

TABLE 4

|  | Example #13 | | | |
| --- | --- | --- | --- | --- |
|  | A1 | A2 | B1 | B2 |
| Silicone Compound | A | A | B | B |
| Properties |  |  |  |  |
| Mooney (1 + 10)@121° C. | 37 |  | 33 |  |
| Cure Conditions | A/M | PC | A/M | PC |
| Durometer, Shore A | 57 | 60 | 55 | 61 |
| Tensile strength, MPa | 12.2 | 12.6 | 12.5 | 11.0 |
| Elongation, % | 325 | 268 | 332 | 258 |
| Permeation mm · gm/day · m$^2$ |  | 2510 |  | 3860 |

The invention claimed is:

1. A method for preparing a fluorocarbon elastomeric base composition comprising:
   (I) mixing
   (A) a silicone base comprising
      (A') a diorganopolysiloxane containing at least 2 alkenyl groups having 2 to 20 carbon atoms, and
      (A") an optional reinforcing filler,
   (B) an optional crosslinking agent,
   (C) a free radical initiator cure agent, to form a silicone compound;
   (II) mixing the silicone compound with
   (D) a fluorocarbon elastomer having a glass transition temperature ($T_g$) below 15° C.,
   (E) compatibilizer selected from;
      ($E^1$) an organic compounds which contain 2 or more olefin groups,
      ($E^2$) organopolysiloxanes containing at least 2 alkenyl groups,
      ($E^3$) olefin-functional silanes which also contain at least one hydrolyzable group or at least one hydroxyl group attached to a silicon atom thereof,
      ($E^4$) an organopolysiloxane having at least one organo-functional groups selected from amine, amide, isocyanurate, phenol, acrylate, epoxy, and thiol groups,
      ($E^5$) a dehydrofluorination agent, and any combinations of ($E^1$), ($E^2$), ($E^3$), ($E^4$) and ($E^5$),
   (F) an organic peroxide catalyst; and
   (III) dynamically vulcanizing the silicone compound, wherein the weight ratio of fluorocarbon elastomer (D) to silicone base (A) in the etastomeric base composition ranges from 95:5 to 30:70.

2. The method of claim 1 wherein the crosslinking agent is present and is an organohydrido silicon compound.

3. The method of claim 1 wherein the fluorocarbon elastomer comprises a copolymer of vinylidene fluoride and hexafluoropropene, a copolymer of tetrafluoroethylene and propylene, a terpolymer of vinylidene fluoride, hexafluoropropene, and tetrafluoroethene, or a terpolymer of vinylidene fluoride, tetrafluoroethene, and perfluoromethylvinyl ether.

4. The method of claim 1 wherein steps II and III are performed in a extruder in <2 minutes.

* * * * *